Jan. 9, 1968   LE ROY E. BARWICK ET AL   3,362,449
STATIC-FREE BOLT

Filed Sept. 20, 1965

INVENTORS.
LeRoy E. Barwick
William L. Leonard
BY
Robert W. Lattimer
ATTORNEY

United States Patent Office 3,362,449
Patented Jan. 9, 1968

3,362,449
STATIC-FREE BOLT
Le Roy E. Barwick, East Stroudsburg, and William L. Leonard, Tobyhanna, Pa., assignors to McGraw-Edison Company, Milwaukee, Wis., a corporation of Delaware
Filed Sept. 20, 1965, Ser. No. 488,437
5 Claims. (Cl. 151—37)

ABSTRACT OF THE DISCLOSURE

A static-free bolt comprising a bolt shank having a rectangular washer secured at the head end thereof by upsetting material of said shank to fill a non-circular aperture in said washer and to form enlarged portions on the shank on each side of said washer in tight engagement therewith. The washer is curved about an axis parallel to a diagonal thereof so as to define a pair of opposed contact points for bearing against a workpiece.

---

This invention relates to bolts and, more particularly, to a static-free bolt wherein no loose washer is present to create interference with radio and television signals.

It is the present practice to form static-free bolts by forging a complete unit or by projection welding, or otherwise positively securing a washer to the head portion of a fully fabricated bolt.

In the present invention the necessity of starting with a completely fabricated bolt is eliminated. A length of bolt stock which is to be fabricated into a static-free bolt initially has an end portion partially squared to permit it to be extended through a tapered square aperture in a washer to which it is thereafter secured. The end portion thus preformed is inserted through the aperture with the cylindrical shank portion of the bolt held in a gripping die. A cooperating die providing a preformed anvil surface is moved axially against the squared end portion and by electroforging the end portion is compressed to form the head end of the bolt which retains the washer captive. Thus, in a single operation a head is formed at the convex side of the washer and a collar at the concave side while the material between the head and collar has been upset to completely fill the space within the aperture. By this method, a more positive and intimate bond is achieved between the bolt shank and the washer and a torque resisting interlock is provided between the two elements of the integral structure. The curved washer cooperates with the curved surface of a pole to resist the necessary torque to tighten the nut. This method is also economical since the head and collar formation and the upsetting of the material in the aperture space are accomplished simultaneously during the forging operation.

It is an object of this invention to provide an improved static-free bolt construction.

It is a further object of this invention to provide a static-free bolt without the necessity of initiating the fabrication using a completely formed bolt.

It is also an object of this invention to provide a static-free bolt that may be more easily installed in the field.

These and other objects and advantages of this invention will become apparent from the following description when taken in connection with the accompanying drawings, wherein.

Figure 1:
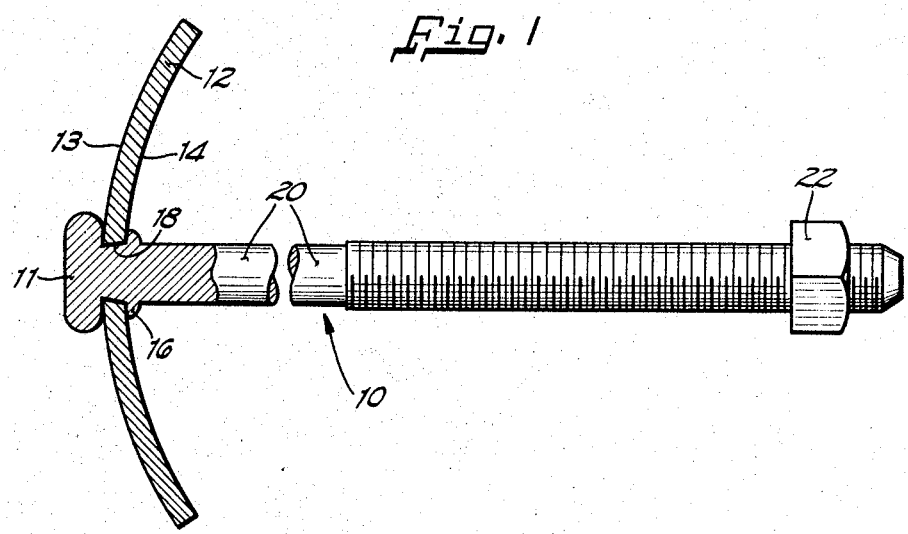
FIGURE 1 is a side elevation, partially in section, of the static-free bolt structure of this invention.
Figure 2:
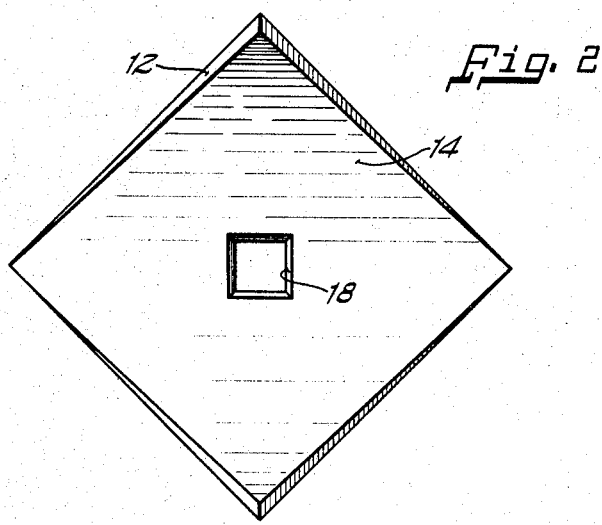
FIGURE 2 shows the curved, square washer portion of FIGURE 1.

Referring to the drawings, FIGURE 1 shows the static-free bolt 10 with the portions about the head in section. The head portion 11 includes a curved washer 12 having a convex surface 13 and a concave surface 14. The bolt head portion 11 adjoins convex surface 13 and the collar 16 presents an axial surface that abuts the concave surface 14 of the captive washer 12. As seen in FIGURE 2, the central aperture 18 is of square section and tapers from the concave surface 14 to the convex surface 13. The bolt portion intermediate head 11 and collar 16 fills the square section aperture to resist relative rotation between bolt shank 20 and washer 12.

The bolt will normally be utilized as a through bolt for holding equipment to a pole of circular section. The concave surface 14 of the washer 12 combined with the interlock between the washer and bolt shank 20 is sufficient to prevent rotation of the bolt 10 as the nut 22 is tightened during assembly of the bolt to a pole and it is, therefore, unnecessary to provide any surfaces on the head 11 for holding engagement by a tool to prevent rotation. It will be recognized that other structures could be used to prevent relative rotation between the washer and the abutting structure, such as for example, a planar washer having turned serrated marginal edge portions that would bite into the adjoining pole surface to provide torque resistance while the nut is tightened. There is accordingly no need to utilize a fully fabricated bolt to form the static-free structure and installation is more readily accomplished by elimination of the necessity of holding the bolt against rotation as the nut is tightened.

Figure 3:
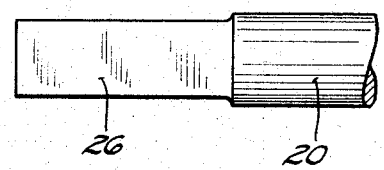
FIGURE 3 is a side view of a length of bolt stock with the end portion squared preparatory to fabrication into the bolt of FIGURE 1.
Figure 4:
FIGURE 4 is an end view of the bolt stock of FIGURE 3.

The bolt is fabricated by preforming the end of a piece of bolt stock as shown in FIGURES 3 and 4 with a generally square sectioned end 26 which is of a size to be received through the square aperture 18 of the washer. The square washer 12 is fabricated with a centrally located aperture 18. The washer is curved about a line parallel to the diagonal line lying on one surface of the washer and the aperture is formed with wall surfaces that taper from the concave surface to the convex surface of the washer. The square shank end 26 is inserted through the washer aperture 18 and the bolt as thus loosely assembled is placed in a gripper die which constricts against the circular bolt shank 20. The gripper die serves one electrode and an anvil which axially engages the squared end serves as a second electrode with the anvil moving axially to electroforge the end portion, simultaneously upsetting the head portion 11 and collar portion 16 and also causing the material of the bolt shank to fill the space defined by the aperture walls.

Although intimately confining the washer 12 between the head 11 and collar 16 provides additional assurance that the washer is securely bonded to the shank, not only to retain the washer but also to assure that no loosely connecting relation exists it would not be necessary to provide the collar at the concave surface. The cooperation between the head portion axial surface confronting the washer where the bearing load is received in the installed condition and the tapered aperture will provide a secure intimate interlock between the washer and the bolt.

Although but one embodiment has been shown and described, it will be apparent to those skilled in the art that various changes and modifications may be made therein without departing from the spirit of the invention or from the scope of the appended claims.

What is claimed is:
1. A static-free bolt comprising a square washer formed of sheet material and curved about an axis parallel to a diagonal of one of the major surfaces thereof; said washer having a convex outer surface and a concave inner surface; wall means defining an aperture of noncircular section through said washer and diverging from its outer to its inner surface; a bolt shank having one end projecting through said aperture and a threaded surface portion adjacent the end opposite said one end, said one end being forged to form a head engaging the convex surface of said washer and a collar engaging the concave side of said washer with the portion between said head and said collar upset to fill the space within said aperture, whereby said washer and said shank are bonded together as an integral unit with a torque resisting interlock therebetween.

2. A static-free bolt assembly including a bolt and a curved washer having an inner surface for engaging a cooperating adjoining surface to prevent relative rotation therebetween, a noncircular aperture formed through said washer and having side walls which diverge toward its inner surface, a shank end portion of said bolt extending through said aperture and having a head portion formed thereon from upsetting the material of said end portion and forcing the same against the side of said washer opposite said inner surface, a collar formed on said shank portion by upsetting said shank material and forcing the same against said inner surface of said washer adjacent said aperture and the shank portion between said head and said collar being upset to fill said noncircular aperture, whereby said washer is bonded to said shank as a rigid integral assembly.

3. The method of forming a static-free bolt assembly comprising a bolt and a washer, one end of said bolt being threaded, the steps of providing a noncircular aperture in said washer, forming a portion adjacent the other end of said bolt to generally conform to the configuration of said aperture, inserting said portion through said aperture, simultaneously upsetting axially spaced sections of said portion to form a head on said bolt at one side of said washer and a collar at the other side thereof and to fill the space defined by said aperture, and forcing said head and collar into engagement with the opposite sides of said washer.

4. The method set forth in claim 3 wherein said axially spaced sections are upset by forging.

5. The method set forth in claim 3 wherein said axially spaced sections are upset by electrical forging.

References Cited

UNITED STATES PATENTS

| | | | |
|---|---|---|---|
| 162,386 | 4/1875 | Hubbard | 151—38 |
| 418,198 | 12/1889 | Lemp et al. | 29—522 |
| 795,553 | 7/1905 | Sherman | 85—50 |
| 1,033,163 | 7/1912 | Ellmann | 85—50 |
| 1,435,586 | 11/1922 | Collette | 85—9 |
| 2,007,179 | 7/1935 | Bullis | 29—522 |
| 2,376,397 | 5/1945 | Spencer | 29—522 |
| 2,928,170 | 3/1960 | McLaughlin | 29—522 |
| 3,160,188 | 12/1964 | Frank | 85—37 |

FOREIGN PATENTS

| | | |
|---|---|---|
| 138,171 | 2/1920 | Great Britain. |

CARL W. TOMLIN, *Primary Examiner.*

R. S. BRITTS, *Assistant Examiner.*